UNITED STATES PATENT OFFICE.

FERDINAND G. WIECHMANN, OF NEW YORK, N. Y., ASSIGNOR TO FENOFORM CORPORATION, OF HASTINGS-UPON-HUDSON, NEW YORK, A NEW YORK CORPORATION.

PRODUCTION OF ANHYDROUS PRODUCTS FROM PHENOL AND FORMALDEHYDE.

1,218,146.  Specification of Letters Patent.  Patented Mar. 6, 1917.

No Drawing. Original application filed January 30, 1912, Serial No. 674,243. Divided and this application filed August 26, 1913. Serial No. 786,712.

*To all whom it may concern:*

Be it known that I, FERDINAND G. WIECHMANN, a citizen of the United States, residing at New York, in the county of New York and State of New York, have invented certain new and useful Improvements in the Production of Anhydrous Products from Phenol and Formaldehyde, of which the following is a specification.

My invention consists in the process of making an anhydrous reaction product of phenol and formaldehyde by a single reaction, and further, the process of making a composite body containing an anhydrous reaction product of phenol and formaldehyde with a suitable filling material; as also a new article of manufacture consisting of an anhydrous reaction product of phenol and formaldehyde alone or associated with a filler, and other bodies such as abrading materials, alone or associated with coloring materials and the like.

One of the objections to processes heretofore suggested for making condensation products of phenol and formaldehyde is found in the fact that more or less water is formed in and retained by the initial condensation product, which when such product is used alone or is combined with other materials, is objectionable, in that when such initial condensation product alone or combined with other materials, is subjected to heat to effect polymerization, such water is set free and vaporized in the form of steam, and makes the secondary product spongy, which action can only be overcome by subjecting the initial condensation product or the initial condensation product and the other materials, during the process of manufacture into commercial forms, to the simultaneous action of heat and pressure, or the addition of water-combining agents.

To carry my invention into effect, I take a determined quantity of crystallized carbolic acid, phenol ($C_6H_6O$) or some of its homologues, for instance, 100 parts of phenol. To this I add paraform ($C_3H_6O_3$) in the form of a dry powder. Instead of using paraform, I may use any dry or condensed type of formaldehyde, either in the form of a solid or a gas, for instance, from 10 to 35 parts of paraform or its equivalent, according to certain qualities of the product desired, to 100 parts of the phenol. After these bodies are mixed, I subject them to the action of heat, *i. e.* that approximating their boiling point, and which heat should be continued for a definite time, as hereinafter stated. When, for example 35 parts of paraform are used with 100 parts of phenol, the mixture begins to actively react below 90° and the temperature rises somewhat as the reaction progresses.

During all or part of the time the combined substances are subjected to heat, I also subject them to the action of dry ammonia gas, or any other body which will facilitate the production of an anhydrous reaction product of phenol and formaldehyde. The amount of ammonia used may vary within rather wide limits.

This process requires about three hours for its completion, the time varying, however, with the amount of ammonia, or other body added, and the product is a viscous, syrupy body insoluble in water, which upon test with anhydrous copper sulfate will be found to be substantially free from water. The reaction taken place in the above process I would state to be as follows: dry phenol ($C_6H_6O$) plus dry formaldehyde ($CH_2O$) plus dry catalytic (ammonia —$NH_3$)=dry reaction product of phenol and formaldehyde.

The product obtained from the treatment as above described, has the following physical characteristics: It is an anhydrous, viscous non-hygroscopic syrup, insoluble in water, soluble in a mixture of 80% methyl alcohol and 20% amyl alcohol; it may be mixed with many bodies, such for instance as wood pulp, asbestos, vegetable or animal albumen, cellulose, abrading materials, coloring materials, sulfur, rubber, or in fact with most materials comprehended in the terms organic and inorganic bodies.

The anhydrous reaction product may be used as a varnish or a lacquer, alone or combined with solvents such as alcohols, etc., coloring matters, and the like, and the product hardened after application. The reaction product above described, when subjected to heat alone, presents the following characteristics: When subjected to heat of about 80° centigrade for some hours, it passes into the solid condition, but is still softened by heat. After a further heating for several hours more, at a temperature of about 90° centigrade, it is changed in such a manner that it is no longer soluble in the solvent alcohols, as above described, nor in most other solvents, but is still softened by heat and may be placed into molds and is easily shaped to form articles of manufacture. It may also be combined with the substances heretofore mentioned to form such articles. When in this state the product may be molded with or without pressure; when pressure is used, however, this merely acts to give form, and not to prevent the evolution of gaseous vapors which would tend to convert the material into a spongy body. When this last named form of the material is further subjected to a heat of approximately 160° to 180° C., it quickly becomes an insoluble, infusible body, which is insoluble in boiling water and most chemical reagents. This same result is obtained when the product is exposed to a lower heat for a longer time. In this final form it cannot be melted or molded, neither alone nor mixed with any other materials.

What I wish to have understood is that I believe I am the first to describe a process for producing, by one reaction, an anhydrous reaction product of phenol and formaldehyde, and further, to suggest the combination of such product with protein, cellulose, albuminous and similar bodies of vegetable origin, as well as of bodies of mineral origin, alone or incorporated with coloring matters, bleaching agents, and the like.

The term anhydrous is used herein in referring to the product of the present invention as meaning free from water as indicated by test with anhydrous copper sulfate.

This application is a division of my prior application Serial No. 674,243, filed Jan. 30, 1912.

I claim:

1. The process of producing composite bodies which comprises heating a mixture of substantially anhydrous phenol and formaldehyde in the presence of an agent promoting the formation of an anhydrous product until a thick viscous anhydrous and non-hygroscopic syrup has been formed insoluble in water, mixing with such anhydrous syrup a compounding material to form a product plastic at ordinary temperatures, and converting the same into a hard infusible condition by the action of heat.

2. The method of producing composite bodies which comprises heating a mixture of substantially anhydrous phenol and formaldehyde in the presence of an agent promoting the formation of an anhydrous product until a thick viscous anhydrous and non-hygroscopic syrup has been formed insoluble in water, mixing with such anhydrous syrup a vegetable albumen to form a product plastic at ordinary temperatures, and converting the same into a hard infusible condition by the action of heat.

3. As a new article of manufacture a hard and infusible molded body resulting from the action of heat on a mixture of a vegetable albumen and an anhydrous non-hygroscopic liquid reaction product of phenol and formaldehyde, said body being anhydrous and non-hygroscopic, insoluble in water and in most but not all solvents, and containing the vegetable albumen and the reaction product combined into a substantially homogeneous mass, and the reaction product having a chemical constitution representing that of a reaction product of anhydrous phenol and formaldehyde combined under the influence of heat and of a catalytic agent.

FERDINAND G. WIECHMANN.

Witnesses:
JOSEPH A. DOGHUN,
WARD W. SIMMONS.